United States Patent [19]

Matiere

[11] Patent Number: 4,693,635
[45] Date of Patent: Sep. 15, 1987

[54] METHOD OF PRODUCING HOLLOW STRUCTURES AND HOLLOW STRUCTURES

[76] Inventor: Marcel Matiere, 17 Avenue Aristide Briand, 15000 Aurillac, France

[21] Appl. No.: 522,169
[22] PCT Filed: Oct. 29, 1982
[86] PCT No.: PCT/FR82/00177
  § 371 Date: Jul. 15, 1983
  § 102(e) Date: Jul. 15, 1983
[87] PCT Pub. No.: WO83/01823
  PCT Pub. Date: May 26, 1983

[30] Foreign Application Priority Data
Nov. 17, 1981 [FR] France .................. 81 21510
Jun. 11, 1982 [FR] France .................. 82 10266

[51] Int. Cl.$^4$ ............... F16L 9/22; E03F 3/00; E21D 11/00
[52] U.S. Cl. .................. 405/132; 405/126; 405/151; 138/155
[58] Field of Search ............ 405/132, 134–136, 405/137, 142, 146, 147, 149, 150–153, 154, 157, 124–126; 52/587; 138/157–159, 161, 162, 164, 166, 105, 177, 178, 155

[56] References Cited

U.S. PATENT DOCUMENTS

| 109,886 | 12/1870 | Freeman | 405/126 |
| 1,004,288 | 9/1911 | McAlpine | 405/151 |
| 1,474,808 | 11/1923 | Zucco | 405/150 |
| 1,535,162 | 4/1925 | Kime | 405/124 |
| 1,572,197 | 2/1926 | Ferguson . | |
| 1,638,428 | 8/1927 | Zander | 405/126 X |
| 2,015,102 | 9/1935 | Doig | 405/153 X |
| 2,400,071 | 5/1946 | Bull . | |
| 3,508,406 | 4/1970 | Fisher | 405/124 |
| 3,733,831 | 5/1973 | Sticker, Jr. | 405/134 X |
| 3,786,267 | 10/1973 | Chlumecky | 405/152 |
| 4,018,054 | 4/1977 | Standley | 405/150 |
| 4,027,488 | 6/1977 | Preradovich | 405/153 X |
| 4,314,775 | 2/1982 | Johnson | 405/124 X |

FOREIGN PATENT DOCUMENTS

| 689778 | 6/1964 | Canada | 405/153 |
| 2157191 | 5/1973 | Fed. Rep. of Germany . | |
| 2927040 | 1/1981 | Fed. Rep. of Germany | 405/135 |
| 733098 | 9/1932 | France . | |
| 910476 | 6/1946 | France | 405/124 |
| 935451 | 6/1948 | France | 405/126 |
| 2030937 | 11/1970 | France . | |
| 2075442 | 10/1971 | France . | |
| 2354502 | 1/1978 | France . | |
| 2375438 | 8/1978 | France | 405/150 |
| 873248 | 7/1961 | United Kingdom . | |
| 1232299 | 5/1971 | United Kingdom | 405/152 |

Primary Examiner—Cornelius J. Husar
Assistant Examiner—Nancy J. Stodola
Attorney, Agent, or Firm—Frost & Jacobs

[57] ABSTRACT

A method for producing cylindrical hollow bodies bearing on the ground along one generatrice, of large cross sectional area, by assembling on site previously prepared longitudinal components.

The method consists in determining by calculation the optimum cross-sectional profile of said hollow body as a function of known parameters concerning the site, conditions of use of said hollow body and its inherent characteristics; divising said optimum cross-sectional profile into adjacent sections each corresponding to a longitudinal component of the hollow body and together providing a substantially continuous interior surface; and giving the transverse wall section of at least some of said components a variable thickness for adapting the latter component to the stresses to be exerted thereon.

7 Claims, 20 Drawing Figures

METHOD OF PRODUCING HOLLOW STRUCTURES AND HOLLOW STRUCTURES

FIELD OF THE INVENTION

The present invention relates to a method for producing hollow structures of cylindrical or a similar concave configuration bearing on the ground along one of its generatrices.

Such structure are typically large cross-section conduits, for example larger than the conventional industrial fabrications of about 2 m², which may or may not be underground, for carrying water or other fluids, which may or may not be pressurized, or even for ducts for cables or passageways for pedestrian or vehicular traffic or standing.

The invention is also applicable to small cross-sectional area conduits, for example up to 1 m². It is also applicable to the production of structures of similar configuration to the production of structures of similar configuration but relatively short in length for use as cellars, silos or bomb shelters.

Although the invention is essentially described with reference to large cross-sectional area conduicts it is not limited to such a technical field.

PRIOR ART

Various techniques are used for laying or installing conduits for, inter alia carrying water, transporting petroleum products, or carrying cables or other conduits.

The most commonly used technique comprises utilizing tubular sections of circular cross section which are assembled end to end by various methods. This technique has drawbacks which increase with the diameter of the conduit even if the lengths of the sections are shortened, viz., manufacture, transportation, handling and installation. In any event, other than the problems of fabrication, problems of shear size are posed once you reach an outer diameter of 2.5 m which corresponds to the normal limit for road transportation. For carrying very large quantities of fluids a plurality of parallel conduits must be provided, which is an expensive solution, or the conduit may have to be fabricated at the construction site in accordance masonry construction techniques or work carried out in underground galleries which is also expensive and time-consuming for fabricating or building.

Moreover, as is known, conduits of circular section are best adapted to high internal pressures. Such a cross section is the easiest to produce when sections corresponding to the entire cross-section or contour of the conduit are fabricated. On the other hand, such a circular cross section has drawbacks for other uses. A conduit of circular cross section produces stresses in the bearing ground having a pronounced maximum in the median region. Consequently, if the soil is loose, considerable differential subsidence may occur after the conduit is laid. Circular cross sections are poorly suited for good use of crowded space in an urban environment. Finally, the weight of the conduit is comparatively high; indeed, the constituent material is in the case of unitary sections covering the entire cross section or contour uniformly distributed along the entire periphery whereas the stresses are not so distributed.

To overcome these various problems it has been proposed, see for example German patent No. 215 71 91, to construct conduits having cross sections flattened at their base by assembling on site previously prepared longitudinal members, each corresponding to a part of the contour or cross section of the conduit and made of corrugated sheet metal. Such structural components have a low mechanical strength with respect to external forces so that one is unsure of maintaining the contour and the fluidtightness of seals. Further, the corrugations increase flow resistance.

French patent No. 733,098 and U.S. Pat. No. 2,400,071 disclose techniques consisting in assembling a large number of small dimension components each having a transverse flange for assembling adjacent components. The large number of components means they have to have identical configurations which leads to adopting a cross section of circular contour and in this case the stress resistance requires that the junctions alternate in the longitudinal direction. U.S. Pat. No. 2,400,071 provides taking into account the stresses exerted on the conduit wall and using for the upper part of a tunnel, components having lower strength than those for the lower part. Yet an assembly of aternating joints of components of different characteristics is of uncertain strength and in addition this introduces a further complication in the assembly of a great number of small components which is difficult to execute satisfactorily with unskilled workers.

OBJECT AND SUMMARY OF THE INVENTION

Thus, it appears that there is an unsatisfied want for a method for producing cylindrical hollow structures or the like bearing on the ground along a generatrice having a cross-sectional shape with a flattened base, in particular large cross-sectional area conduits, which method produces structures having a high mechanical strength, and fabrication, transportation and installation costs considerably reduced with respect to current techniques.

According to a first aspect of the invention there is provided a method for producing conduits having a cross section with a flattened base by assembling on side previously prepared (each corresponding to a part of the cross section of wall of the conduit) longitudinal components, the components for the lower part of the cross section of the conduit having an overall transverse curvature less than that of the other components, the method being characterized by the steps of: calculating the stresses to which each of the components will be subjected in service, determining the material and/or thickness of the components as a function of the calculated stresses, and preparing the components of the determined material and/or thickness and devoid of corrugations.

According to another interesting aspect of the invention there is provided a method for producing conduits of large cross sectional area by assembly on site previously prepared (each corresponding to a part of the cross section of the wall of the ultimate conduit) longitudinal components, said method being characterized by the steps of: calculating the optimum cross-sectional profile of the conduit as a function of known parameters concerning the site, conditions of use of the conduit and its inherent characteristics; dividing the optimum cross-sectional profile into adjacent sections each corresponding to a longitudinal component of the conduit and together providing a substantially continuous interior surface; and giving the transverse wall section of at least some of the components a variable thickness for adapting such components to the stresses to be exerted thereon.

Preferably, the shape of the longitudinal components is determined so that at least some of the longitudinal joints between adjacent components are located proximate to "stress nodes", i.e., points where the absolute value of transverse stresses on the passes through a minimum.

In most cases the joints of structures, according to the invention, are not alternately arranged. On the contrary, the longitudinal joints are continuations of one another to either side of each transverse joint.

A first advantage of the method according to the invention over the current technique is ease of transportation. Assuming that the maximum permissible dimension is 2.5 m, the current technique permits the transportation of one section having an outer diameter at most 2.5 m. If the components of the invention each correspond to a quarter of the ultimate conduit, the latter may have a diameter of about 3.5 m, or twice the cross-sectional area, and if the components each correspond to one-sixth of the ultimate conduit, the latter may have a diameter of about 4.4 m or triple the cross-sectional area. Further, for a height of 2.5 m there is available within the same volume space for a considerable number of unitary components stacked on one another whereby the transporting vehicle may carry its maximum useful load. On the other hand the total length of the junctions to be effected by welding or otherwise is obviously increased. It should be observed that they are normally straight joints which are much easier to produce or carry out than circular joints and the number of joints may, on the contrary, be reduced owing to the greater unitary length of the components which is permitted by the reduced unitary weight.

Another advantage of the invention results from the noncircular contour of the structure, the drawbacks of conduits of circular contour having been given above.

Furthermore, owing to the cross section being flattened at the base, a considerable improvement of the distribution of the stresses produced in the subjacent ground, and the movements thereof may be greatly diminished. Another advantage of such cross-sectional shapes or profiles is a lesser height for a given cross-sectional flow area, thereby reducing the excavation costs (digging, shielding and holding back subterranean water, etc.). On the other hand, when the consistency of the bearing ground so requires (aquifers in particular) ballast may be incorporated on the conduit by means of masses of metal or concrete which are suitably bolted under bottom wall of the conduit. The weight of the ballast is, of course, calculated as a function of the actual properties of the particular site and each of the ballast elements may also be prefabricated. The conduit may also be anchored to the ground by the same bolting procedure which is made easier from within owing to the flattened shape of the bottom wall.

Further, the previous calculation of the stresses to which the conduit components are subjected and the use of the results of the calculations to determine the thickness of each component, the variation of the thickness of the transverse section from one point to another, the constituent material of the component and the location of the longitudinal joints, offer important advantages:

Frequently the upper part of a conduit only has a protective function and is subjected to limited stress. On the other hand the weight of the fluid carried when it is water or another free flowing liquid, obviously bears more on the lower part than at the top of the conduit. Further, the fluidthightness at the assembly joints permits the conduit to withstand internal pressure and for this reason used for carrying pressurized fluid. It will also be noted that since the ultimate configuration of the conduit is uniform and effectively integral, it will not be necessary to provide abutments for changes in direction which are sources of longitudinal thrust. The possibility of adapting the thickness and the constituent material of the component enables large savings to be realized on the production costs and transportation.

As indicated above, the various components may be of different thicknesses depending on the result of the stress calculations. They may be of different materials on condition, however, that, whenever appropriate, necessary precautions are taken to avoid corrosion caused by electrochemical couples.

Among the materials preferred owing to their relatively low cost and their availability and ability to be assembled by welding or other methods there may be cited ductile cast irons, but other materials may be envisaged alone or in combination, such as steel, aluminum alloys, other metals, fiber-reinforced or non fiber-reinforced plastics, prestressed or non prestressed, reinforced or non reinforced concrete. In the latter two cases it is obvious that the welds mentioned above are to be replaced with suitable connections.

In case of conduit components cast in a single piece or by continuous profiling, notably, by extrusion, of materials such as ductile cast iron, steel, reinforced concrete, resins, etc., a mold or die is used having a transverse section shaped to reproduce, by acting on the inner surface of the conduit component the aforesaid variations of optimum profile and also the transverse variation of the thickness.

The changes of direction are obtained by curved or angled prefabricated components which are specially calculated and adapted to the requisite geometry.

The fabrication of the conduit according to the invention, i.e., of (part-cylindrical) components corresponding to only a part of the contour or cross section but which, by compensation, may be of great length, poses specific problems at the time of assembly. The problems have been solved by the following assembly procedure which is therefore closely linked to the main feature of the invention. According to this procedure the components are initialy assembled by connecting them both longitudinally and transversely together by means permitting limited relative displacement of adjacent components and a flexible sealing member is inserted therebetween, and then rigid assembly of the components is effected after the surrounding ground and the entire conduit have been stabilized. Preferably, the initial assembly of the components to one another is effected by means of bolts traversing an corresponding enlarged aperture in at least one of the components.

Nevertheless other modes of assembling the components may be found to be more advantageous, in particular in joints where high stresses require large wall thicknesses. In such cases one or more of the following methods is preferred.

To effect the longitudinal junction and optionally the transverse junction of conduit components, recessed or projections are provided in corresponding edge zones of adjacent components and in form and/or force mating relation for providing the necessary transverse and longitudinal joints.

To provide longitudinal joints, a rib is formed on each one of the edges of two components to be joined and clamping means are clamped on the ribs at spaces locations.

The clamping means are rigid or resilient U-shaped members.

The clamping means are fixed by rigid or resilient shims force-fitted between the inner surface of the clamping means and the flank of the corresponding rib or by resilient deformation of the actual clamps;

The gaskets or sealing members having a section shaped to correspond with the edges of the transverse and longitudinal joints, are interposed between the edges and their fluidtight sealing action is ensured by means of the clamps or by collars, hoops, prestressing cables or other means;

In case the components are made of weldable or bondable materials the longitudinal and transverse joints are effected by additional amounts of corresponding welding or bonding material.

According to an interesting procedure, for facilitating the installation and stabilization of the conduit, stabilizing members or triangular longitudinal section are provided on the side of the lower surface of the conduit. These stabilizing members have a planar horizontal side which is approximately at the level of the bottom of the conduit, an approximately vertical or inclined planar side, and a side which mates with that of the conduit. The stabilizing members are preferably discrete and at spaced locations along the conduit for preventing the lower component from swinging about its longitudinal axis after installation.

The stabilizing members may be secured by bolting, welding or other means on the corresponding structural components of the conduits. In case the conduit is cast (e.g. in concrete) they may also be integrally formed therewith.

Other than their interest for stabilizing the entire conduit the stabilizing members are advantageous in case the conduit is formed of components of which some bottom and others the sidewalls having a generally vertical orientation. By fixing the stabilizing members beforehand on the sidewall components or forming them in one piece with the sidewall components the latter are able to remain upright, bearing on the ground which facilitates the formation of their junction with the bottom wall components which were brought into position first. Then the upper wall components may be installed by bringing them to bear on the sidewall components.

In some the cross-sectional area of a hollow structure is relatively small e.g. a conduit of about 1 to 4 m², the entire contour may be defined by only two components, one corresponding to the lower part and the sides of the conduit and the other forms a cover. Such components have at least a part which may be made of concrete or other cast or molded material.

According to another method of producing useful joints in case the components are made of concrete or other cast or molded material, there are provided on the edges of the longitudinal components angle members of weldable or bondable material on which is fixed after positioning and preferably after stabilization flat sealing members of a material compatible with that of the angle members.

In certain cases, in particular when transporting or storing dangerous fluids, or for constructing bomb shelters, perfect sealing is required even in case of movements of the ground or a nearby explosion, and if the components are made of concrete or material which may crack or lose its fluidtightness in another manner, a fluidtight lining or covering is advantageously provided which may or may not be fixed to the components of the structure.

In some cases the lining may form a part of permanent shuttering for the components of the structure. If the lining is made of metallic or non-metallic sheet or other weldable or bondable material flat members of the type indicated above may be welded or bonded to the joints of this lining, or the parts of the lining between the flat members may be welded or bonded directly thereto at the level of the joints.

If the structure, conduit or shelter, is formed of concrete components, the crush resistance is furnished by the concrete components and the inner lining of metallic or non-metallic sheet or of plastics material, welded bonded or coated provides absolute fluidtightness to radioactive or other contaminations or infiltrations, even if the movements due to the ground or to an explosion have deformed the structure.

The following examples are essentially relative to conduits of large cross-sectional area, but it will be readily understood that it is equally applicable to silos, shelters or other similar structures.

In case of a prefabricated bomb shelter longitudinal wall components are positioned which may likewise be for large cross-sectional conduits and the shelter is closed at its ends by planar or convex transverse walls. Preferably, the shelter has a substantially flat bottom and the base and side components are equipped with side stabilizing members integrated during fabrication or added subsequently so as to prevent the shelter from swinging about its longitudinal axis.

Advantageously an inner fluidtight lining is provided particularly if the shelter is built of concrete.

The shelter may be installed very fast, because it is made of separate components which may be easily transported for assembly at the desired site. It may be installed in an excavation which is then filled in or in certain circumstances it may simply be placed on the ground. It will be noted that the flattened dwelling configuration provides enhanced blast resistance compared with masonry shelters of cylindrical or parallelepipedic shape.

The invention will now be described in greater detail with the help of non-limiting embodiments illustrated in the drawings.

DESCRIPTION OF THE PREFERRED EMBODIMENTS

Figure 1:
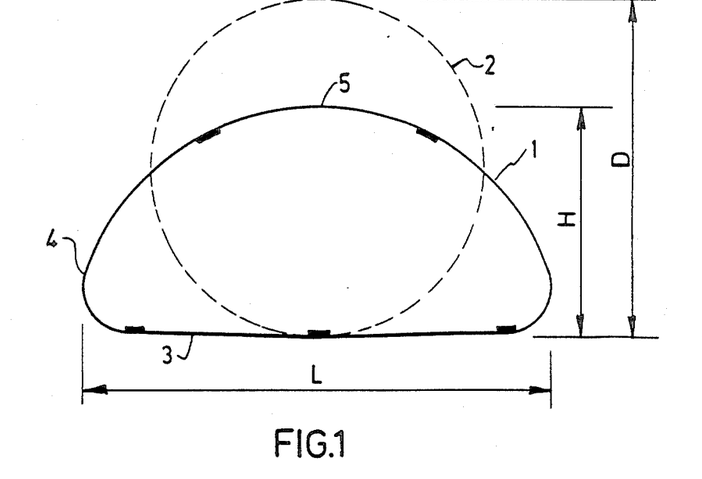
FIGS. 1 to 3 are schematical cross-sectional views of conduits according to the invention.

FIG. 1 shows, in solid line, the cross section of a conduit 1 produced in accordance with the invention and by comparison in dashed line the cross section of a conduit 2 having a circular cross section and the same interior cross-sectional area. The conduit according to the invention comprises five components of the same length assembled together.

Two base components 3 are substantially flat; two side components 4 are of variable curvature greater at the bottom than the top; the conduit profile or cross-section is completed by an accurate upper component 5. The illustrated example corresponds by way of example to an interior cross-sectional area of 10 m². The overall height H is 2.40 m and the width L is 5.00 m, compared with the diameter D of the corresponding circular conduit which is 3.57 m. The excavation necessary for the conduit according to the invention is wider at the base than that of the circular cross-sectional conduit but it is not as deep; all in the volume excavated for the conduit of the invention may be less, and the work may be easier.

Figure 2:
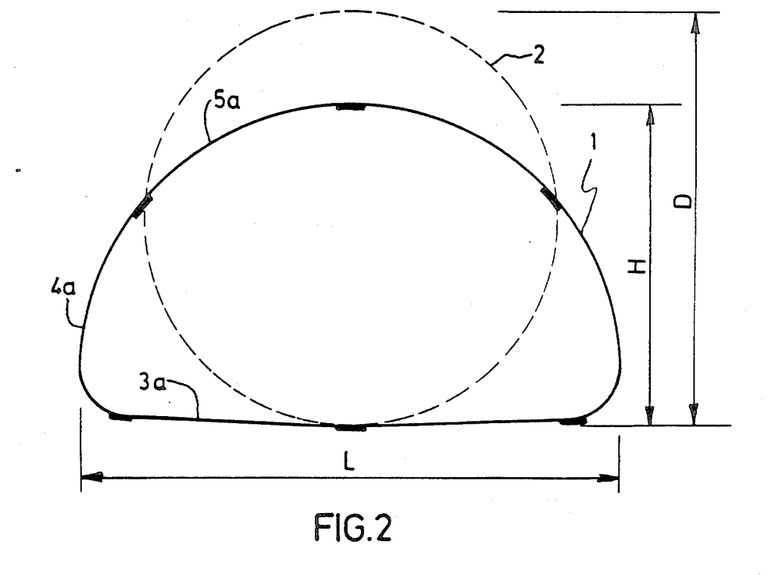

FIG. 2 shows another embodiment of the conduit according to the invention in which the base components 3a are slightly cambered and there are two upper components 5a instead of one.

Figure 3:
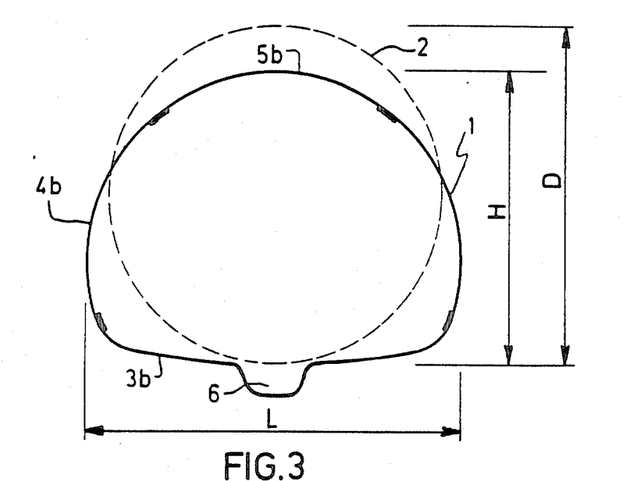

FIG. 3 shows yet another embodiment which has the peculiarity of a central trough or gutter 6 along the bottom wall component 3b. The trough or gutter 3b is provided in the middle of component 3b and is slightly flared so that the components 3b are identical and stackable for transport, but other arrangements are possible. According to a conventional technique the provision of such a trough or gutter poses a nearly insoluble problem.

Figure 4:
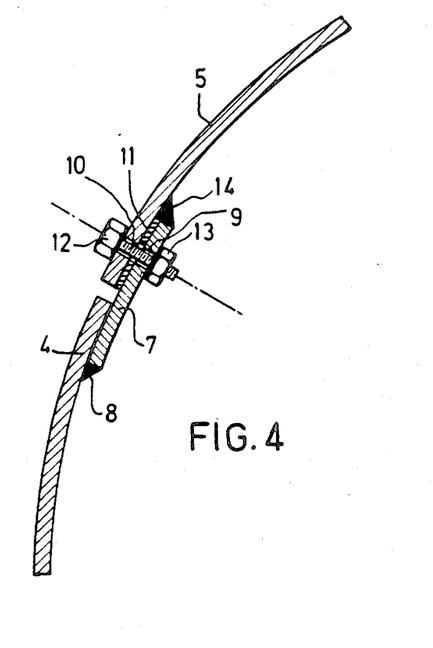
FIG. 4 is a fragmentary sectional view illustrating a mode of assembly.

FIG. 4 illustrates a mode of joining two components 4, 5 arranged like components 4a and 5a in FIG. 2.

In a first step the component 4 is provided with a connecting plate 7 fixed by a weld 8 which may be done at the factory or at the site. Plate 7 has enlarged apertures 9 which, during assembly, come into register with the enlarged apertures 10 in component 5. On assembly a flexible sealing member or gasket 11 of elastomer or the like, is interposed between component 5 and plate 7 and then securement follows by means of a bolt 12 and nut 13.

When the series of components corresponding to the following section of the conduit is assembled, slight relative movements may occur between components 4 and 5, for example under the action of variations of the level of the excavation. Such slight movements may also be the consequence of consolidation of the subjacent ground. All these movements are made possible by the enlarged configuration of apertures 9 and 10. When these movements have cased the final joining of the components may be effected by a weld 14. The bolt 12 and nut 13 may thereafter be removed, and apertures 9 and 10 or only one of them may be closed off with a weld.

Figure 5:
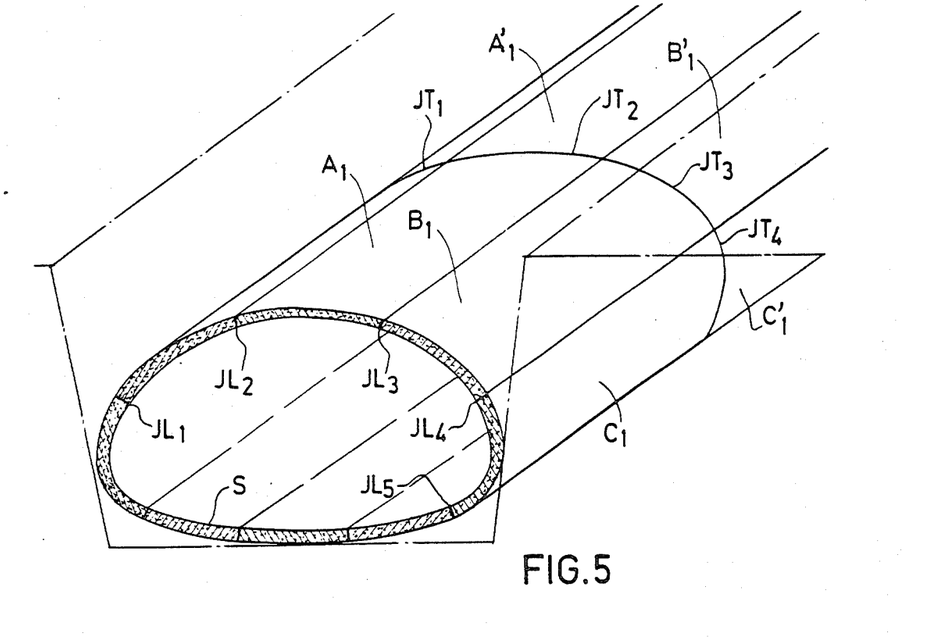
FIG. 5 is a schematic perspective view of a conduit having its various sections formed of longitudinal components with the joints represented.

FIG. 5 illustrates in schematic perspective view a conduit made by the method according to the invention. The conduit comprises longitudinal components such as A1, B1, C1 etc. for the first section, A'1, B'1, C'1, etc. for the second section and so on. These components are connected to one another by longitudinal joints JL1, JL2, JL3, JL4, etc. and transverse joints JT1, JT2, JT3, JT4, etc.

The method according to the invention comprises a first step of calculating in a known way, the optimum cross-sectional profile of the conduit as a function of known parameters concerning the installation site, the inherent properties of the conduit per se and its conditions of use. In the calculation the forces acting on the conduit are taken into account, including:

the weight of the conduit alone,
the weight of fluid flowing through the conduit,
the pressure established in the conduit,
the possible overpressures resulting of the use of hydraulic apparatuses e.g. valves,
the hydrostatic pressure of the subterranean water in which the conduit may possibly be located,
the load of fill covering the conduit,
fixed overload which may possibly be present on the fill,
moving overload which may be caused by the fill,
temperature and hygrometric variations,
reaction bearing forces, etc.

As indicated in the preamble of the description it is interesting to obtain a profile in which the lower part is rather flat and the upper part corresponds to a curve resulting of the optimization of the calculus of the stresses.

The second step comprises dividing the resulting optimum cross-sectional profile into adjacent sections each corresponding to a longitudinal component, such as A1, B1, etc., together providing a substantially continuous interior surface, designated by S in FIG. 5.

Figure 6:
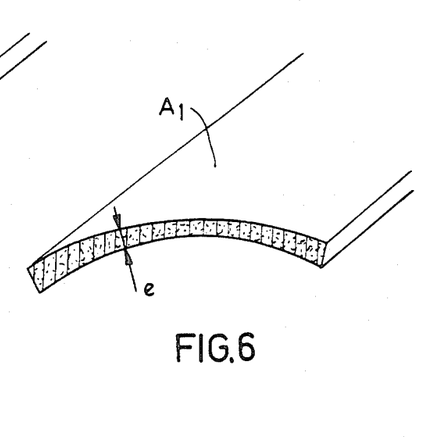
FIG. 6 illustrates an embodiment of a conduit component having a gradual reduction of radial thickness toward the center.
Figure 7:
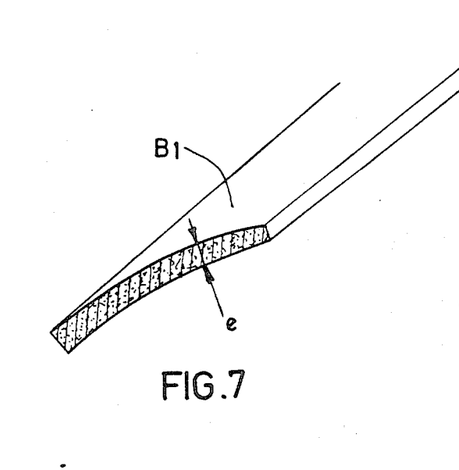
FIG. 7 illustrates an embodiment of a conduit component having a gradual increase of transverse thickness from left to right.

The third step comprises giving the transverse section of at least some of the components a variable thickness for adapting the component to stresses exerted at different points thereon. As illustrated in FIGS. 6 and 7 the transverse sections of the conduit components show the thickness of the wall of the component may vary.

This feature is extremely important for the fabrication, transportation and assembly of the component since the amount of material and therefore the weight and the production cost are defined as accurately as possible as a function of the parameters governing the construction of the ultimate conduit. If the application of the invention to the construction of very long pipelines for carrying petroleum or water, etc. is considered, the effect of a saving in weight on the ultimate profitability of the construction of the pipeline will be readily appreciated.

The conduit components according to the invention may be made of different materials and fabricated by different processes accordingly. Thus it will be possible to envisage the fabrication of elements such as A1, B1, C1, etc. of metal such as ductile cast iron, modular cast iron, steel, aluminum alloys, etc. For such materials it is possible to use different processes such as casting piece by piece, continuous casting, extrusion, forging, differential rolling, etc. All these processes permit the production in a uniform manner of the recesses and projecting portions which are to be used subsequently, for assembling the components, in making the longitudinal and transverse joints as will be explained below.

It is also possible to construct the conduit components of other materials, namely, reinforced concrete, fiber reinforced or non-reinforced plastics or resin materials, etc. under these circumstances the elements are made by casting by means of molds or forms which also permit the aforesaid recessed and projecting portions to be obtained.

All the processes of using the above-defined materials for making conduit components according to the invention require the tooling, dies, molds, shuttering, forms, etc., which must take into account the features of the method for producing the conduits according to the invention in the following conditions:

the interior surface of the fabricated conduit component must correspond to the optimum cross-sectional sectional profile of the conduit, determined by calculation as a function of the known parameters concerning the type of installation, the conditions of use of the conduit and its inherent characteristics. The term "optimum cross-sectional profile" is intended to mean, in the case of external conditions which vary little, an average cross-sectional profile for a given length of the conduit;

each component must have overall dimensions permitting its assembly with other conduit components and the different thicknesses of the components must be calculated to withstand the stresses to which they are to be subjected.

The final sealing is obtained by various means corresponding to each material which is used. It is achieved from the inner space of the conduit after definitive stabilization (settling, compensation of dilatations, compacting etc...)

Figures 8, 9:
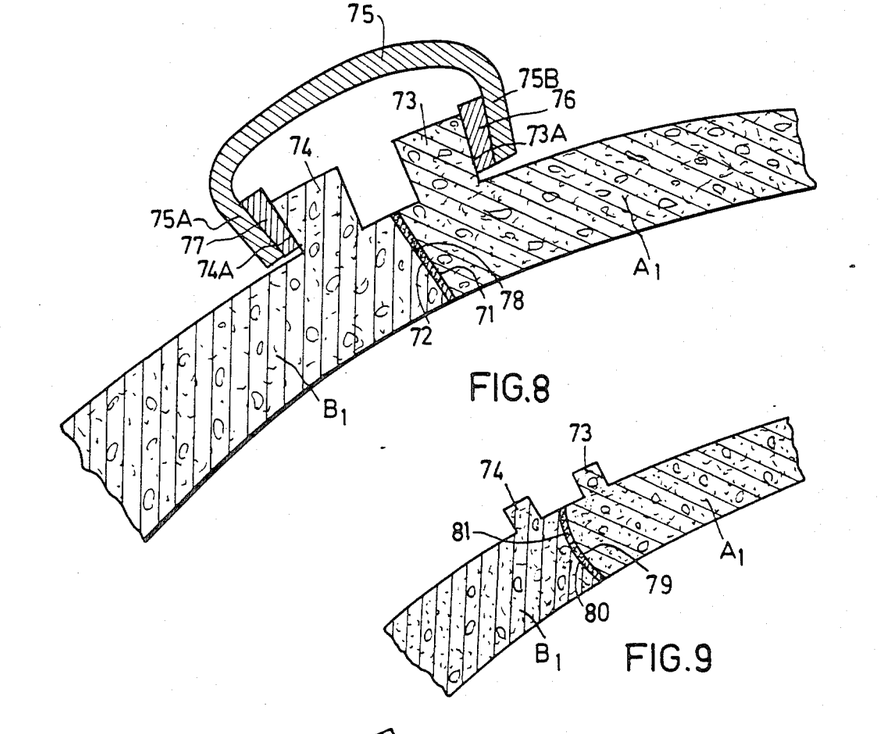
FIG. 8 shows a cross-sectional view of a longitudinal joint with ribs and clamping means.
FIG. 9 shows an embodiment of interfitting edges between two conduit components for forming a longitudinal or transverse joint.

We shall now describe how to assemble the various components to form a conduit, with reference to FIGS. 8 to 12 which illustrate several embodiments of longitudinal and transverse joints. Thus, in cross-sectional view in FIG. 8, is illustrated a longitudinal joint provided between conduit components A1 and B1. In this case there is provided to opposite sides of the joints defined by the two surfaces 71 and 72 of components A1, B1, respectively, external longitudinal ribs 73, 74 which extend along the entire length of the corresponding conduit components A1 and A2. These ribs may be formed during the casting, extrusion, rolling or molding of the corresponding components or they may be fixed thereto by welding in which case they may be discontinuous. The two ribs permit, as shown in FIG. 8, the simple and efficacious securement by a U-shaped clamping member 75 in cooperation with wedges or shims 76, 77 which are force-fitted into position between the clamp and the corresponding ribs by hammering or any other similar procedure.

To absorb the reaction forces exerted in a direction perpendicular to the cross-sectional profile of the conduit, it is appropriate to provide the lateral edges or surfaces delimiting the conduit components A1, B1, etc. with configurations which permit them to withstand stresses in the best possible way, taking into account the parameters related to the conditions of fabrication and use of the conduit and also the constituent material. Thus, by way of non-limiting examples, there are given in FIGS. 8, 9, and 10 several different models of cross-sectional profiles of the lateral edges or surfaces delimiting the conduit components. In FIG. 8, the edges or surfaces 71 and 72 of delimitation are inclined with respect to the plane perpendicular to the cross-sectional profile of the conduit components. Such a configuration of the lateral surfaces of the joint are suitable, for example, when the static loads exerted on the conduit predominate.

In FIG. 9 the lateral edges or surfaces 79 and 80 of the conduit components A1, B1 have complementarily rounded shapes so as to absorb the reaction forces exerted in both directions in the plane perpendicular to the cross-sectional profile of the section.

Figures 10, 11:
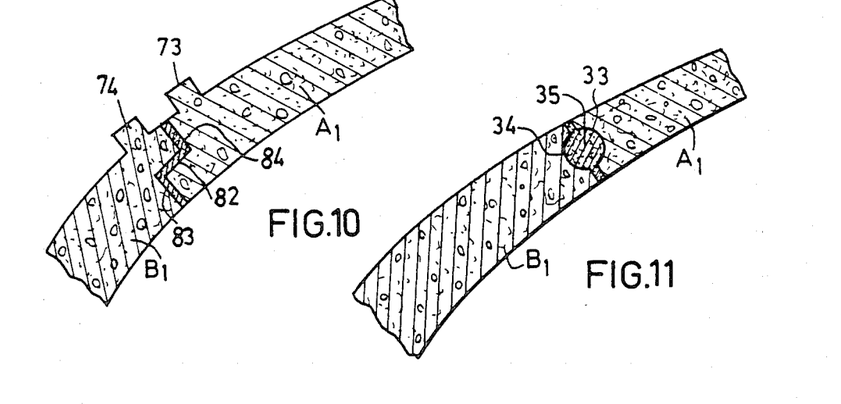
FIG. 10 illustrates an embodiment of a lap joint between the edges of components for forming a longitudinal or transvers joint.
FIG. 11 illustrates yet another configuration of edges of components for forming a longitudinal or transverse joint.

In FIG. 10 is represented step-like lateral edges or surfaces 82 and 83 to form a lap joint or interfit.

In FIG. 11 are illustrated cross-sectional profiles 33 and 34 defining a pocket which may be filled with a sealing material, for example, cast resin.

It is to be noted that these lateral edges or surfaces of the conduit component may be made by any of the foregoing processes. To establish good fluid tightness, in each case there is provided between the lateral edges or surfaces corresponding to the aforesaid longitudinal joints, grout, calking, mastic, cement, liners or other sealing means, namely, of natural or synthetic rubber, as indicated respectively at 78 in FIG. 8, 81 in FIG. 9 and 84 in FIG. 10.

In this respect it should be noted that these joints ensure fluid tightness under pressure.

Figure 14:
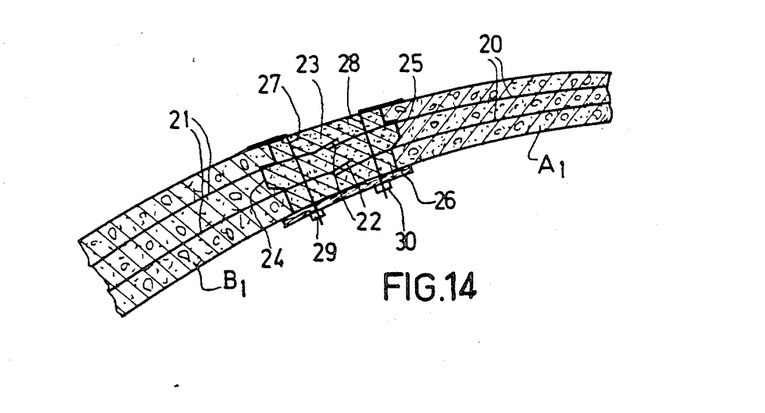
FIG. 14 shows a joint for components made of reinforced concrete.

In FIG. 14 a longitudinal joint is illustrated which is provided between two conduit components A1, B1 made of reinforced concrete. References 20 and 21 designate the respective reinforcements of components A1, B1. To provide a connection therebetween, the reinforcements 20, 2 are allowed to protrude beyond their components during casting or forming, and once the components are in position at the site of installation of the conduit, the free ends of the protruding parts of the reinforcements are connected to each other, as shown at 22, then by using suitable formwork or shuttering such as at 26, sealing or anchoring mortar 23 is poured into the existing space to form the sought after longitudinal joint.

In FIG. 14, are shown at 24 and 25 angular and recessed configurations for connecting edges for components A1, B1. These edge configurations are intended to facilitate the attachment of the sealing mortar 23 and also to perfect the fluid tightness of the joint by forming discontinuities for eleminating local leak passages. References 27 and 28 designate members for holding the formwork or shuttering 26 which are secured into position by means of nuts 29,30.

Figure 12:
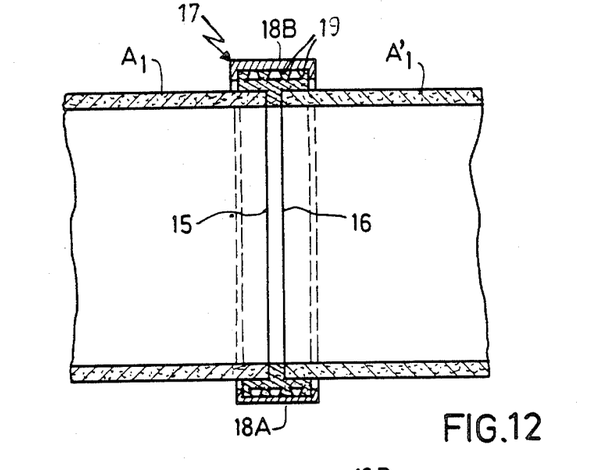
FIG. 12 illustrates an embodiment of an interfitting transverse joint the fluidtightness of which is ensured by an annular sealing member or gasket of special profile which is compressed by a suitable hoop.
Figure 13:
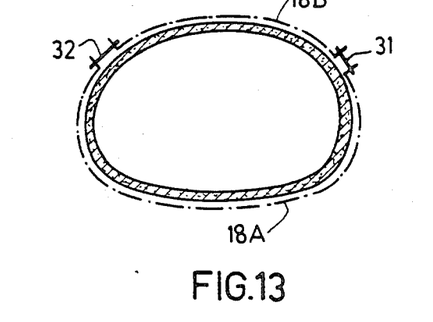
FIG. 13 is a cross-sectional view of conduit of FIG. 12, showing the hooping of the sealing member or gasket.

In FIG. 12 is illustrated an embodiment of a transverse components such as A1, etc. and A'1 etc. of joint between adjacent two sections of the conduit. References 15 and 16 designate transverse edges or surfaces of the transverse joint. In the illustrated embodiment a peripheral joint designated overall by reference 17 is provided comprising a radial bead which is fitted in the annular space between the transverse edges or surfaces 15, 16 and a peripheral ring whose inner surface bears against the outer surfaces of the respective conduit components. The peripheral ring comprises along its outer peripheral surface relief portions or protrusions 19 adapted to be flattened by compression by means of a hoop or collar as shown in FIG. 13 which is a cross-sectional view of the conduit of FIG. 12. In the illustrated embodiment of FIG. 12, given by way of non-limiting example the relief portions or protrusions 19 may have a dovetail section and dividers in the dovetail recesses so as to define labyrinth type joints. The hoop or collar comprises two parts 18A, 18B connected together by tensioning means 31, 32 which are adjusted to provide the ultimate tightening.

It should be noted that although all the embodiments of joints between conduit components do not utilize bolts, bolting is certainly not excluded and flange or rim like portions may be formed or fixed on the conduit components and then assembled together by means of nuts and bolts or similar fasteners.

In some applications it is possible, within the purview of the invention, to provide a conduit of composite structure, i.e. some components being formed of a first material such as reinforced concrete in a first part of the conduit, for example the base between the longitudinal joints JL1 and JL4 in FIG. 5, and other components being formed of a second material, for example, a metal or a fiber-reinforced or non-fiber reinforced plastics material, in the rest of the conduit. Such a composite structure may be recommended for a water supply work in an open ditch, that is, without high loads on the top of the conduit, in a remote area where it is profitable to fabricate the lower part of cast reinforced concrete at the construction site and have the upper part of thin components prefabricated in a factory and transported to the construction site.

Figure 15:
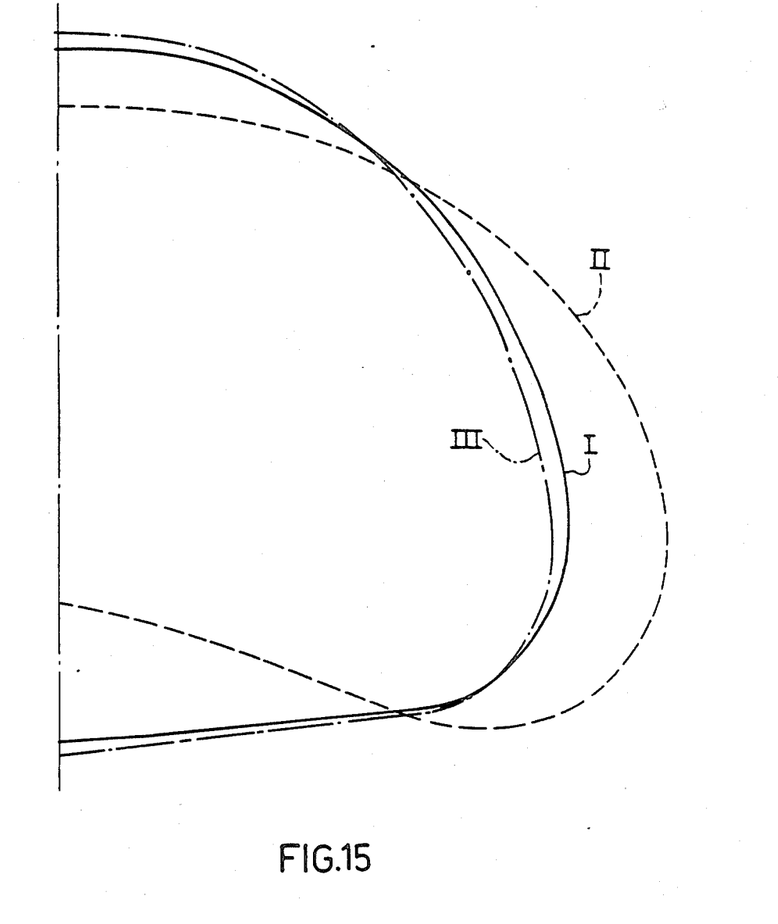
FIG. 15 shows a diagram illustrating the results of stress calculations.

FIG. 15 shows, in solid line, the shape of the neutral axis of a conduit section according to the invention (curve I), in dashed line (curve II) the distribution of the bending moment corresponding to the vertical force exerted by the ground, and in chain-dotted line, (curve III) the distribution of the bending moment corresponding to the lateral force of the ground. The complete calculation also comprises the determination of a certain number of similar curves, corresponding, for example, to the internal pressure, the weight of the conduit itself, etc. The calculation then comprises the combination of the results each corresponding to a type of stress.

It will be observed that the complete cross-sectional profile or shape of the section comprises four "nodal" zones, located in the lower part of the conduit and in the upper part of the conduit.

Figure 16:
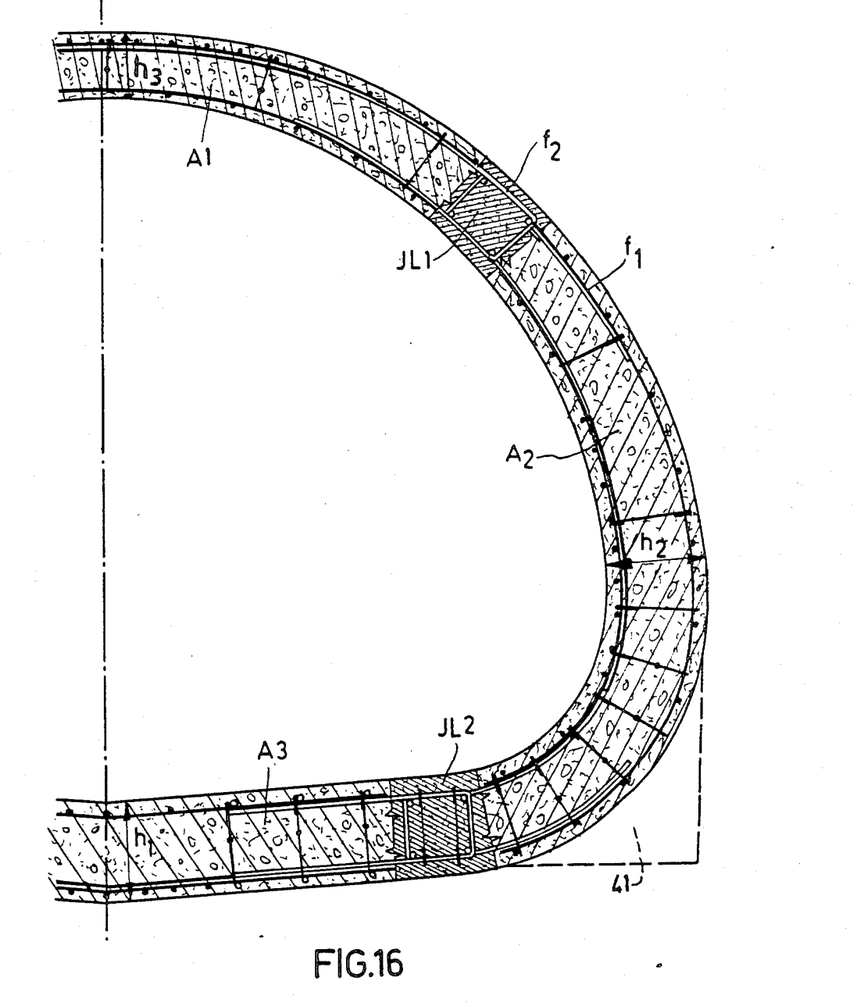
FIG. 16 is a cross-sectional view through part of a hollow structure of reinforced concrete corresponding to the illustrated results of stress calculations of FIG. 15.

FIG. 16 shows a half cross-sectional view of a conduit formed of four reinforced concrete components.

It is noted that the thickness ($h_1$, $h_2$) in the zones corresponding to the highest stresses in FIG. 15, i.e., at the middle of the base and along the sides is about 50% greater than the thickness $h_3$ at the top. The joints JL1, JL2 between components have been placed in the "nodal" zones. In this figure the reference f1 designates the reinforcement members embedded in the concrete of the components fabricated beforehand and reference f2 designates the anchoring members which are bent over one another before being embedded in the concrete during the construction of the structure.

Figure 17:
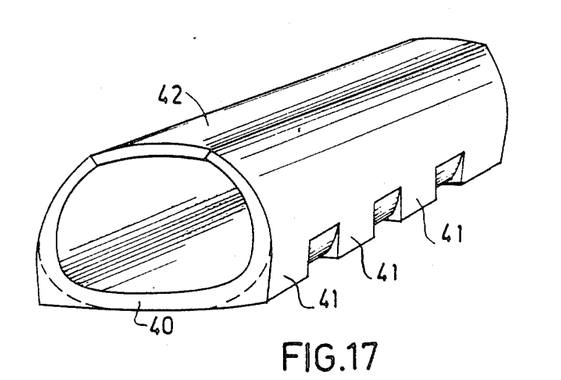
FIG. 17 illustrates another embodiment specially adapted to small section conduits.

FIG. 17 shows an embodiment adapted for a relative small cross-sectional area conduit: about 1.5 to 4 $m^2$. For the sake of simplification, the section of the conduit is divided into two components which may be transported separately without particular difficulties by reason of their small dimensions. The lower component 40 is cast in concrete and comprises a flat-bottom base and the sides. It will be observed in addition that the lower component 40 comprises stabilizing members 41 which are integrally formed therewith and facilitate installation in a flatbottom ditch. The stabilizing members 41 are of generally triangular cross-section with their lower sides horizontal. For the sake of lightening the weight of the structure the stabilizing members do not extend along the entire length of the component 40. The upper component 42 of the conduit is of simpler shape, being of inverted gutter shape with a very small curvature. The upper component 43 may be cast, molded or extruded. In case the lower component 40 is to be extruded it is plain that the stabilizing members 41 will have to be fixed subsequently, but before installing the conduit, by bolting, welding or any other suitable means.

In FIG. 16 is illustrated a stabilizing member 41. This figure reveals another advantage of the stabilizing member in the case of a structure having a section formed of more than two components. Indeed, it will be noted that the side component A2 provided with the outer stabilizing member 41 is self-supporting in its ultimate position. Provisional support during the formation of the joint JL2 with the base component A3 is therefore unnecessary.

It is also noted in the case of a structure bearing on the ground, the stabilizing member increases the resistance to lateral forces tending to overturn the structure, which is advantageous in the case of a bomb or other type of shelter which may be supported on the ground and exposed to the effects of a blast.

Figures 18, 19:
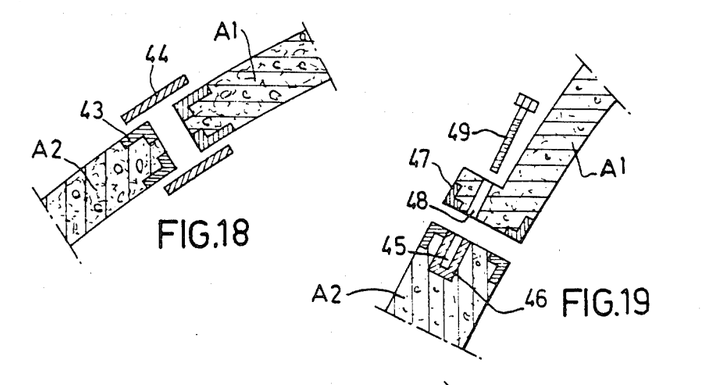
FIG. 18 illustrates a mode of providing the fluidtightness for a joint.
FIG. 19 illustrates tightening a joint.

FIG. 18 shows a method of making fluidtight joints in the case the components are not weldable nor bondable, being made of concrete for example.

Each component A1, A2 has along its edges angle members 43 of weldable or bondable material, e.g., ferrous metal, which are secured in place during casting if the component is so fabricated. The flat connecting members 44 of ferrous metal or other material weldable or bondable on the angle members 42 are welded or bonded to the latter, possibly after being stabilized on the ground.

FIG. 19 shows another assembly method for structures according to the invention.

One of the components A2 comprises a threaded bore 45 which may be provided in a bush or insert 46. The threaded bore 45 is erected approximately perpendicular to the plane of the joint. The other component A1 has a shoulder 47 with a hole 48 in which a threaded fastener 49 is inserted and threaded into the bore 45, there being clearance between the shank of the fastener 49 and the hole 48.

Figure 20:
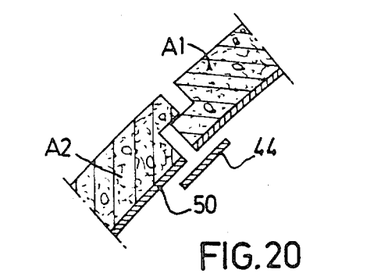
FIG. 20 illustrates another mode of providing sealing.

FIG. 20 shows another embodiment for making the joint fluidtight in which the concrete components A1, A2 are provided along their inner surfaces with a fluid-tight liner or covering 50 of sheet metal defining permanent shuttering. A flat interior member 44 is then welded directly to the liner 50. An angle member similar to those shown in FIG. 18 may be provided on the other side of components A1, A2.

It is to be noted that certain of the above mentioned assembling dispositions are used for the installation of the conduit, and do not sustain alone essentially the hydrostatic pressure in the case of a pressurized conduit, since in this case the hydrostatic pressure is partly compensated by the thrust of the packing.

For a better solidarization of the components of a conduit, shelter etc., and to make easier the obtention of the joints, one may provide, other than encirling cables, prestress cables or bars which connect therebetween longitudinal components which are lengthwise adjacent. Each of those cables or bars may connect at least two consecutive components. For instance a component may be connected to the following by a set of cables or bars, and to the preceding by another set of cables or bars, thereby the prestress may be operated progressively during the process of installation. Each prestress cable or bar may also connect three consecutive components or more.

What we claim is:

1. A method for producing an elongated hollow semi-cylindrical body comprising a semi-cylindrical wall and a flattened base which supports said body while lying on a groundsite, said method comprising the following steps:

determining by calculation, the individual stresses and the optimal profile of the hollow semi-cylindrical body, taking into account the totality of the known parameters relative to the site, the conditions of use and the intrinsic charactertistics of the body;

dividing said optimal profile into adjacent parts, at least some of the edges between adjacent parts being situated in the vicinity of stress nodes, where the absolute value of calculated stresses transverse to said semi-cylindrical wall of the body is at a minimum;

determining the stresses to which each of said parts will be subjected in use;

preparing longitudinal components, each corresponding to one of said parts of the cross-section, having the same transverse curvature as the corresponding part, each of said components being formed of a conventional material; and assembling said longitudinal components for constituting at least one part of said body having a whole cross-section.

2. A method according to claim 1, wherein said hollow body is a conduit and specially calculated and adapted curved or angled prefabricated components are provided for changing directions of the conduit.

3. A method according to claim 1, wherein at least two longitudinally adjacent components are connected by cables or bars, and after assembling said components, said components are prestressed by said cables or bars.

4. A method according to claim 3 wherein each component is connected to the longitudinally following component by a set of prestress cables or bars, and is connected to the longitudinally preceding component by another set of prestress cables or bars.

5. The method according to claim 1, comprising preparing said longitudinal components devoid of corrugations.

6. The method according to claim 1, wherein said longitudinal components have corresponding edges, some of said corresponding edges including recesses, while other of said corresponding edges include projections, including the step of providing an outwardly protruding rib on each of the corresponding edges of two adjacent components;

providing sealing members having a section shaped to cooperate with said corresponding edges of adjacent components, interposing said sealing members between said corresponding edges during the assembling operations, and clamping two adjacent ribs at spaced locations to seal said components.

7. A method for producing a hollow body having an internal wall with a cylindrical cross-sectional area up to 10 m$^2$ and constituted of components able to be transported to the construction site and assembled end to end to form tubular sections, said process comprising the steps of:

determining the cross-sectional profile of the hollow body taking into account the site installation, the conditions of use and the intrinsic characteristics of the body;

drawing a graphic of the cross-sectional shape of the neutral axis of the hollow body, adding to the graphic the distribution curve of the bending moment corresponding to the vertical thrust of the ground and the distribution curve of the bending moment corresponding to the lateral thrust of the ground;

combining the results of each of the curves for determining the four zones of stress nodes in which the representative curves cross one another;

dividing the cross-section of the hollow body in four adjacent segments by placing the joints between said segments in said four zones of stress nodes;

preparing for each tubular section four components of said hollow body, each corresponding to one portion of the cross-sectional area of the hollow body, including a base component, two side components and an upper component; and assembling said components end to end for forming said tubular section.

* * * * *